US008804769B2

(12) United States Patent
Tanaka et al.

(10) Patent No.: US 8,804,769 B2
(45) Date of Patent: Aug. 12, 2014

(54) SIGNAL MULTIPLEXING METHOD, SIGNAL DEMULTIPLEXING METHOD, DIGITAL SIGNAL REFERENCE FREQUENCY CORRECTION METHOD, MULTIPLEXING DEVICE, DEMULTIPLEXING DEVICE, RADIO COMMUNICATION SYSTEM, AND DIGITAL SIGNAL REFERENCE FREQUENCY CORRECTION DEVICE

(75) Inventors: Hiroki Tanaka, Tokyo (JP); Motoya Iwasaki, Tokyo (JP); Toshifumi Sato, Tokyo (JP); Yoshitsugu Shimazu, Kawasaki (JP); Atsushi Tsuyuki, Yokosuka (JP)

(73) Assignees: NEC Corporation, Tokyo (JP); NTT Docomo, Inc., Tokyo (JP)

( * ) Notice: Subject to any disclaimer, the term of this patent is extended or adjusted under 35 U.S.C. 154(b) by 1013 days.

(21) Appl. No.: 12/736,061

(22) PCT Filed: Mar. 3, 2009

(86) PCT No.: PCT/JP2009/054374
§ 371 (c)(1),
(2), (4) Date: Sep. 3, 2010

(87) PCT Pub. No.: WO2009/110629
PCT Pub. Date: Sep. 11, 2009

(65) Prior Publication Data
US 2011/0002247 A1  Jan. 6, 2011

(30) Foreign Application Priority Data
Mar. 4, 2008 (JP) ................................ 2008-053228

(51) Int. Cl.
*H04J 3/06*  (2006.01)
(52) U.S. Cl.
USPC ........................................................ 370/503

(58) Field of Classification Search
USPC .................. 370/503; 375/344, 354, 355, 362
See application file for complete search history.

(56) References Cited

U.S. PATENT DOCUMENTS 5,365,468 A     11/1994  Kakubo et al.
6,208,092 B1 *  3/2001   Kim .............................. 315/370
(Continued)

FOREIGN PATENT DOCUMENTS

CN      1080799 A     1/1994
CN      1231551 A     10/1999
(Continued)

OTHER PUBLICATIONS

"The Vanu Anywaye™ Base Station Subsystem", Apr. 2006, pp. 1-10.*
(Continued)

*Primary Examiner* — Brandon Renner
*Assistant Examiner* — Scott M Sciacca
(74) *Attorney, Agent, or Firm* — McGinn IP Law Group, PLLC

(57) ABSTRACT

A multiplexing/demultiplexing device has a phase difference detection part for detecting a phase difference from a reference frequency of a multiplexed signal and a reference frequency of each of input/output lines, an interpolation part for performing an interpolation on a digital transmitting/receiving signal of each of the input/output lines with a signal delayed by time corresponding to the phase difference for each of the input/output lines based on the phase difference detected by the phase difference detection part to obtain a digital transmitting/receiving signal sampled with the reference frequency of the multiplexed signal for each of the input/output lines, and a signal multiplexing/demultiplexing part for performing a multiplex/demultiplex of the digital transmitting/receiving signals of the input/output lines with use of the reference frequency of the multiplexed signal.

17 Claims, 12 Drawing Sheets

(56) References Cited

U.S. PATENT DOCUMENTS

| | | | |
|---|---|---|---|
| 6,366,604 B1* | 4/2002 | Mohindra | 375/146 |
| 6,452,948 B1* | 9/2002 | McCallister et al. | 370/503 |
| 8,238,883 B1* | 8/2012 | Gunasekara | 455/414.1 |
| 2001/0026179 A1* | 10/2001 | Saeki | 327/147 |
| 2001/0043583 A1* | 11/2001 | Sakoda et al. | 370/337 |
| 2002/0077110 A1* | 6/2002 | Ishikawa et al. | 455/452 |
| 2002/0105448 A1* | 8/2002 | Freidhof | 341/61 |
| 2002/0114289 A1* | 8/2002 | Ishikawa et al. | 370/320 |
| 2003/0123527 A1* | 7/2003 | Kim | 375/147 |
| 2003/0137765 A1* | 7/2003 | Yamazaki et al. | 360/39 |
| 2004/0109420 A1* | 6/2004 | Meghelli | 370/321 |
| 2006/0029160 A1* | 2/2006 | Kim et al. | 375/326 |
| 2008/0212502 A1* | 9/2008 | Zhen et al. | 370/295 |
| 2009/0170472 A1* | 7/2009 | Chapin et al. | 455/410 |
| 2012/0122518 A1* | 5/2012 | Behzad et al. | 455/552.1 |
| 2013/0121387 A1* | 5/2013 | Meng et al. | 375/219 |

FOREIGN PATENT DOCUMENTS

| | | | | |
|---|---|---|---|---|
| EP | 0936767 A2 * | 8/1999 | | H04J 13/02 |
| JP | 5-259812 | 10/1993 | | |
| JP | 11-234743 | 8/1999 | | |
| JP | 2002-344290 | 11/2002 | | |

OTHER PUBLICATIONS

Chinese Office Action dated Mar. 5, 2013, with English translation.
English translation of search report of Chinese Office Action.
Korean Office Action dated Jan. 19, 2012.

* cited by examiner

US 8,804,769 B2

SIGNAL MULTIPLEXING METHOD, SIGNAL DEMULTIPLEXING METHOD, DIGITAL SIGNAL REFERENCE FREQUENCY CORRECTION METHOD, MULTIPLEXING DEVICE, DEMULTIPLEXING DEVICE, RADIO COMMUNICATION SYSTEM, AND DIGITAL SIGNAL REFERENCE FREQUENCY CORRECTION DEVICE

TECHNICAL FIELD

The present invention relates to a radio communication system. More particularly, the present invention relates to a signal multiplexing method, a signal demultiplexing method, a digital signal reference frequency correction method, a multiplexing device, a demultiplexing device, a radio communication system, and a digital signal reference frequency correction device for transmitting a signal between a plurality of digital units devices and an amplifier device of radio base station.

BACKGROUND ART

Inexpensive high-speed digital interfaces for relaying a digital signal have been provided in recent years. Therefore, for example, a radio communication system can be configured such that the radio communication system has a long distance between an amplifier device and a digital unit of a radio base station device as shown in FIG. 12.

Referring to FIG. 12, in a radio communication system, an amplifier device (transmitting/receiving power amplifier) provided near an antenna and a digital unit 4 of a radio base station device provided apart from the amplifier device are connected to each other via a digital signal line, and transmitting/receiving signals are transmitted as digital signals.

In this case, if a signal at a radio frequency is converted directly into a digital signal, an extremely high transmission rate is required. Therefore, a transmitting/receiving baseband signal is generally used as a relaying digital signal.

For a baseband signal, there are a method of using a digital signal sequence prior to a waveform shaping process such as filtering and a method of using a signal subjected to a waveform shaping process such as filtering or OFDM (orthogonal frequency division multiplexing). In the former method, a rate of an interface can be made equal to a transmission rate of transmitting/receiving signals. The former method is referred to as 1× sampling. In the latter method, a rate of an interface needs to be higher than a transmission rate of transmitting/receiving signals. The latter method is referred to as oversampling.

In the following description, a clock of a digital signal prior to oversampling (reference frequency) is referred to as a transmission clock, and a clock of a digital signal subjected to oversampling is referred to as a sampling clock.

DISCLOSURE OF INVENTION

Problem(s) to be Solved by the Invention

As described above, an amplifier device and a digital unit of a radio base station device are generally interfaced with each other by a digital signal.

However, an amplifier device can only be provided in limited places. Therefore, a demand for a plurality of radio communication systems to use one amplifier device in common will grow in future. Accordingly, there will be needed a multiplexing/demultiplexing device capable of performing a multiplex/demultiplex operation on a plurality of lines of digital signals so that a plurality of lines of input/output digital signals from digital units of radio base station devices are multiplexed and connected to an amplifier device.

When input/output digital signals of digital units of a plurality of radio base station devices are multiplexed, a sampling clock of the input/output signal to be multiplexed from each of the digital units needs to be synchronized with a sampling clock of a multiplex digital signal for an interface. Therefore, the sampling clocks of the input/output signals to be multiplexed from the respective digital units should mutually be synchronized with each other.

The mutual synchronization is needed for the following reasons. As shown in FIG. 13, if clocks of output digital signals from digital units are not synchronized with a clock of an output digital signal from a multiplexing/demultiplexing device, then problems that some values of transmitting/receiving signal sequences are missed or repeated may arise when the output signals of the digital units are carried on the signal for the multiplexing/demultiplexing device having an asynchronous clock. In the example of FIG. 13, the clock of the output digital signal of the digital unit is not synchronized with the clock of the output digital signal of the multiplexing/demultiplexing device. Therefore, a value of the $(n+2)^{th}$ data of a signal sequence is missed in the output digital signal of the multiplexing/demultiplexing device. Although the multiplexing/demultiplexing device scans the output digital signal of the digital unit at each rising edge of the output digital signal of the multiplexing/demultiplexing device, the multiplexing/demultiplexing device misses the timing for scanning data of the $(n+2)^{th}$ data of a signal sequence because of differences between the clocks.

One of methods for solving those problems is to previously synchronize sampling clocks of input/output signals of respective digital units with each other by synchronizing reference frequencies (reference clocks) of respective radio base station devices with each other.

Meanwhile, in some radio systems, a reference frequency needs to be synchronized with a frequency that meets the purposes of those radio systems. For example, some systems require synchronization with the GPS. Furthermore, other systems require synchronization with a reference clock of a transmission line network.

In those cases, reference frequencies of respective radio base station devices cannot be synchronized with each other. Therefore, sampling clocks of input/output signals from digital units of the radio base station devices are asynchronous to each other.

Thus, if output signals from the respective digital units are directly multiplexed, some values of transmitting/receiving signal sequences are missed or repeated as described above. Accordingly, those output signals cannot be transmitted as a suitably multiplexed digital signal to an amplifier device. Furthermore, the same problem arises when a signal from the amplifier device is demultiplexed for the respective digital units.

The present invention has been made in order to solve at least one of the aforementioned problems. The present invention is to provide a signal multiplexing method, a signal demultiplexing method, a digital signal reference frequency correction method, a multiplexing device, a demultiplexing device, a radio communication system, and a digital signal reference frequency correction device that can multiplex a plurality of asynchronous digital signals and can demultiplex a signal into a plurality of asynchronous digital signals.

Means To Solve The Problem(S)

A multiplexing device according to the present invention is characterized by comprising means for inputting an operation clock of each of input lines as a first reference frequency for each of the input lines, means for inputting an operation clock of an output line as a second reference frequency, means for inputting a first digital signal synchronized with the first clock for each of the input lines, means for detecting phase difference information regarding a phase difference between the first reference frequency and the second reference frequency for each of the input lines, means for performing an interpolation process on the first digital signal with an interpolation signal based on the phase difference information for each of the input lines, means for synchronizing a second digital signal obtained from the interpolation process with the second reference frequency and outputting the second digital signal for each of the input lines, and means for multiplexing the second digital signals respectively outputted for the input lines.

Furthermore, a demultiplexing device according to the present invention is characterized by comprising means for inputting an operation clock of an input line as a first reference frequency, means for inputting an operation clock of each of output lines as a second reference frequency for each of the output lines, means for demultiplexing a digital signal multiplexed in synchronism with the first reference frequency into the first digital signals for the output lines, means for detecting phase difference information regarding a phase difference between the first reference frequency and the second reference frequency for each of the output lines, means for performing an interpolation process on the first digital signal with an interpolation signal based on the phase difference information for each of the output lines, and means for synchronizing a second digital signal obtained from the interpolation process with the second reference frequency and outputting the second digital signal for each of the output lines.

Effect(S) Of The Invention

According to the present invention, there can be provided a signal multiplexing method, a multiplexing device, a radio communication system, and a digital signal reference frequency correction device that can multiplex a plurality of asynchronous digital signals.

Similarly, according to the present invention, there can be provided a signal demultiplexing method, a demultiplexing device, a radio communication system, and a digital signal reference frequency correction device that can demultiplex a signal into a plurality of asynchronous digital signals.

DESCRIPTION OF EMBODIMENTS

Embodiments for carrying out the present invention will be described below with reference to the drawings.
(First Embodiment)

Figure 1:
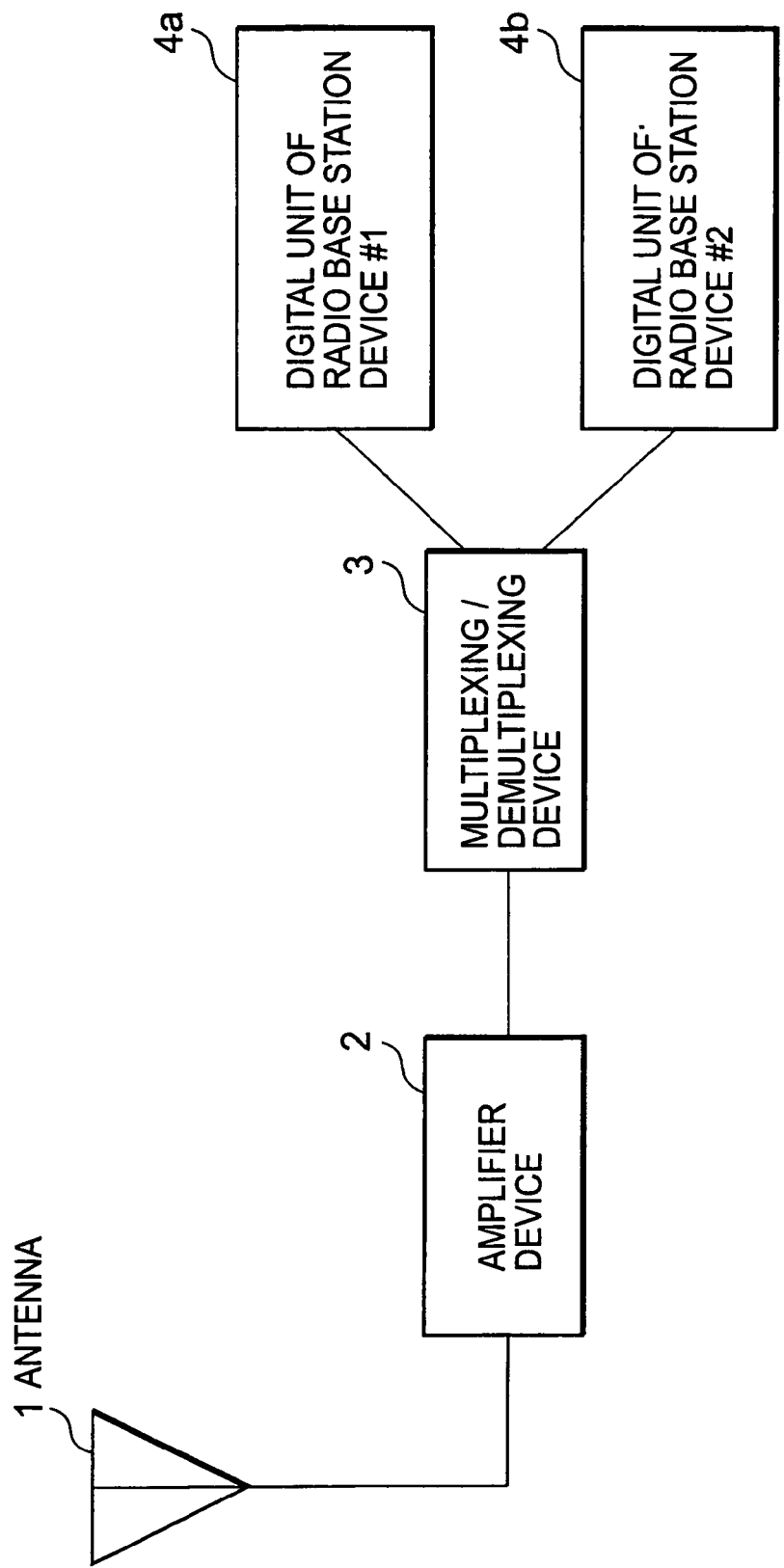
FIG. 1 is a block diagram showing a radio communication system according to a first embodiment of the present invention.

FIG. 1 is a diagram of an overall configuration of a radio communication system according to the present embodiment. Referring to FIG. 1, in the radio communication system according to the present embodiment, an amplifier device (transmitting/receiving power amplifier) 2 connected to an antenna 1, a multiplexing/demultiplexing device 3, and digital units 4a and 4b for a plurality of lines that are provided in base station devices are connected by digital signal lines. Although FIG. 1 shows a radio communication system that multiplexes and demultiplexes for two lines, the same configuration is applicable to a system that multiplexes and demultiplexes for two or more lines.

The multiplexing/demultiplexing device 3 multiplexes digital transmitting signals outputted from a plurality of digital units 4a and 4b into a multiplex digital signal. Furthermore, the multiplexing/demultiplexing device 3 demultiplexes a multiplex digital signal received from the amplifier device 2 into digital receiving signals for the digital units 4a and 4b of the radio base station devices.

In the first embodiment of the present invention, when digital transmitting signals from a plurality of digital units 4a and 4b are multiplexed, an interpolation process is performed on each of the digital transmitting signals. Thus, each of the digital transmitting signals is converted into a digital signal synchronized with an output sampling clock (sampling reference frequency). Similarly, when a digital receiving signal from the amplifier device 2 is demultiplexed, the multiplexing/demultiplexing device 3 performs an interpolation process on each of digital receiving signals included in the multiplex digital signal. Thus, the digital receiving signals are converted into signals synchronized with the sampling clocks of the digital units 4a and 4b, respectively. In the first embodiment, it is assumed that the transmitting/digital receiving signals have been oversampled.

Figure 2:
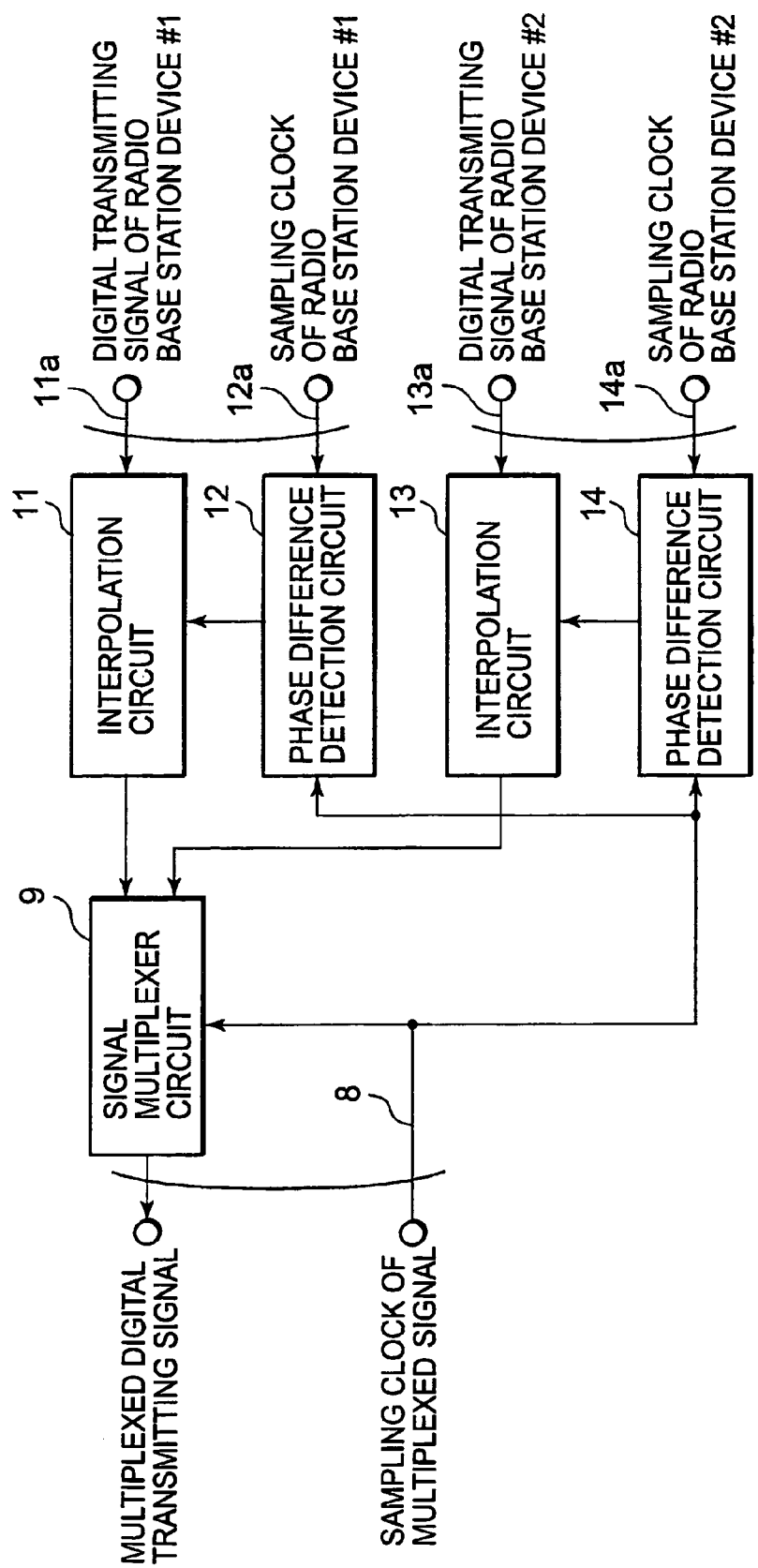
FIG. 2 is a block diagram showing a configuration of a multiplexing/demultiplexing device for transmission according to the first embodiment of the present invention (in a case where input signals are multiplexed).

The details of the multiplexing/demultiplexing device 3 of this embodiment (in a case where input signals are multiplexed) will be described below with reference to FIG. 2. Referring to FIG. 2, the multiplexing/demultiplexing device 3 has interpolation circuits 11 and 13, phase difference detection circuits 12 and 14, and a signal multiplexer circuit 9.

When a sampling clock of a multiplexed signal and sampling clocks of the respective lines of digital transmitting signals are inputted into the phase difference detection circuits 12 and 14, each of the phase difference detection circuits 12 and 14 compares phases between the sampling clocks and detects information on a phase difference between the sampling clocks of the multiplexed signal and the digital transmitting signal, which is hereinafter referred to as phase difference information. The digital transmitting signals outputted from the digital units 4a and 4b of the radio base station devices #1 and #2 and the phase difference information of those sampling clocks are inputted to the interpolation circuits 11 and 13, respectively.

Based upon the phase difference information detected by the phase difference detection circuits 12 and 14, each of the interpolation circuits 11 and 13 performs an interpolation on the inputted digital transmitting signal with a waveform delayed by the time corresponding to the phase difference. As a result, the interpolation circuits 11 and 13 obtain digital transmitting signals synchronized with the sampling clock of the multiplexed signal. The digital transmitting signals obtained by the interpolation circuits 11 and 13 are inputted into the signal multiplexer circuit 9. The signal multiplexer circuit 9 multiplexes those digital transmitting signals at the sampling clock of the multiplexed signal and outputs the multiplexed signal to the amplifier device 2.

The sampling clock of the multiplexing/demultiplexing device 3 can be set to be the same as the sampling clock of either one of the radio base station devices. In such a case, the sampling clock of that radio base station device may be inputted into the other line of the phase difference detection circuit, and the digital transmitting signal of that radio base station device may be inputted directly to the multiplexing/demultiplexing device 3. As a result, the phase difference detection circuit and the interpolation circuit for the radio base station device having the sampling clock used as a reference can be dispensed with.

Figure 3:
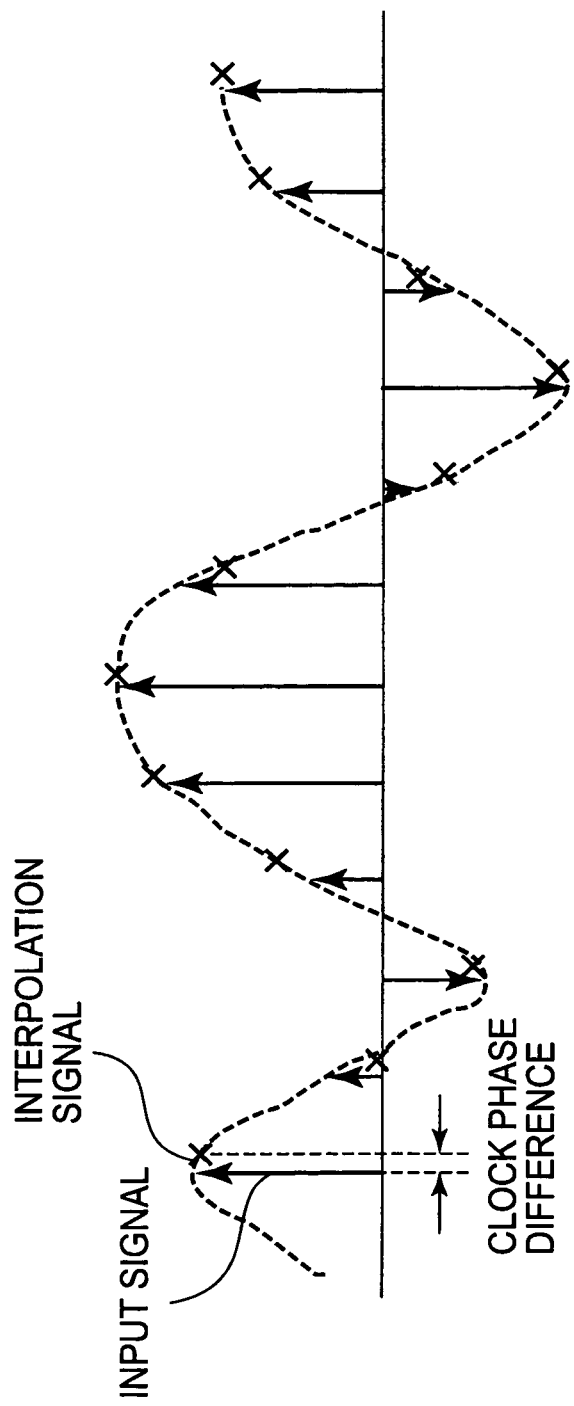
FIG. 3 is a conceptual diagram explanatory of an interpolation operation in the first embodiment of the present invention.

Operation of the interpolation circuit according to the present embodiment will be described below with reference to FIG. 3. Referring to FIG. 3, the interpolation circuit performs an interpolation on a waveform of a digital transmitting signal as an input signal with an interpolation signal having a value of a signal delayed by the time corresponding to the clock phase difference.

Figure 4:
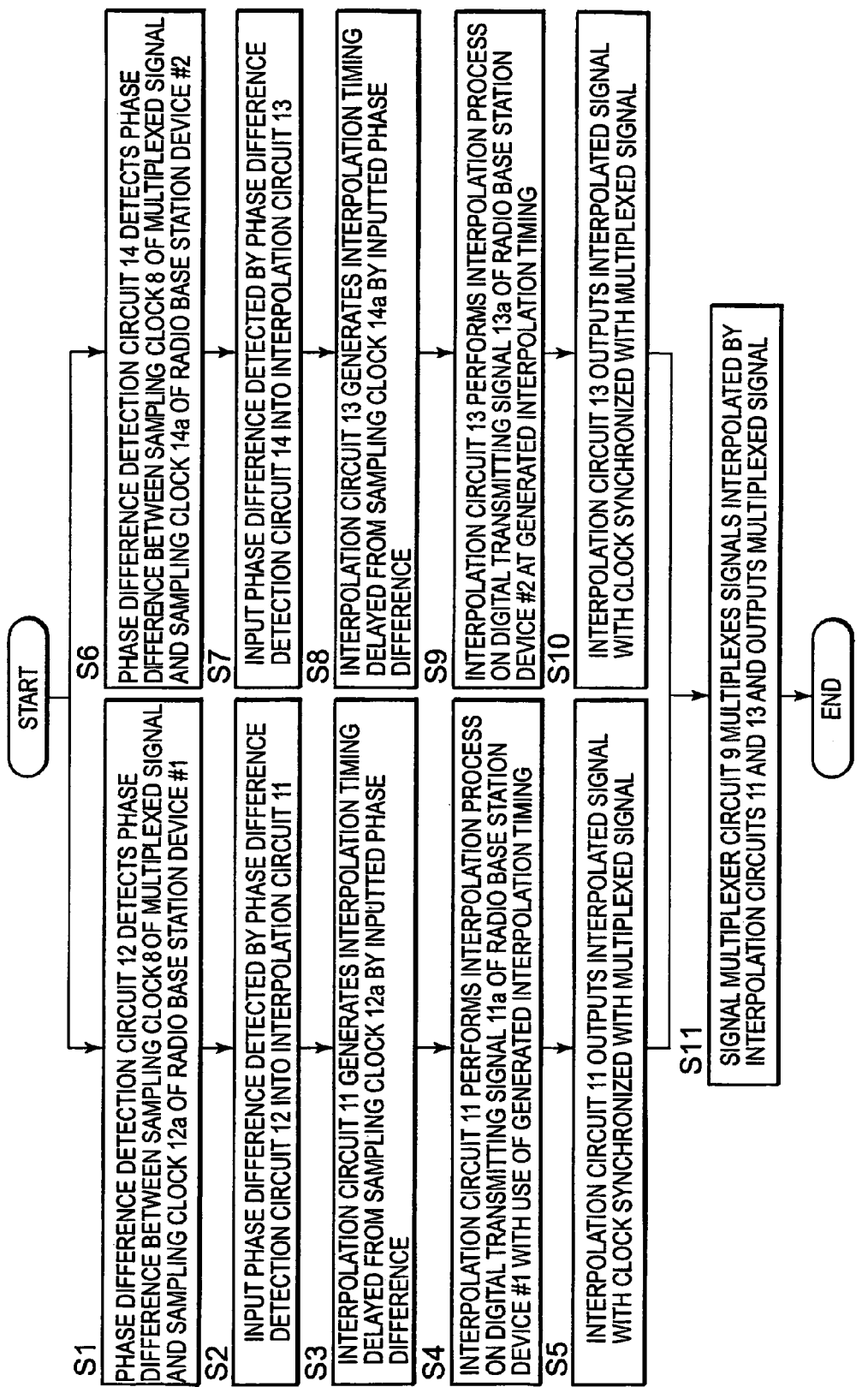
FIG. 4 is a flow chart explanatory of a signal multiplex operation in the radio communication system according to the first embodiment of the present invention.

Operation of multiplexing input signals in the multiplexing/demultiplexing device according to the present embodiment will be described below with reference to FIG. 4. Referring to FIG. 4, a sampling clock 8 of the multiplexed signal and a sampling clock 12a of a digital transmitting signal of the radio base station device 1 are inputted into the phase difference detection circuit 12. Then the phase difference detection circuit 12 detects a phase difference between the sampling clock 8 and the sampling clock 12a (Step S1). The phase difference detected by the phase difference detection circuit 12 is inputted into the interpolation circuit 11 (Step S2). The interpolation circuit 11 generates a sampling timing (interpolation timing) delayed from the sampling clock 12a by the inputted phase difference (Step S3). The interpolation circuit 11 uses the generated interpolation timing to perform an interpolation process on a digital transmitting signal 11a of the radio base station device 1 (Step S4). The interpolation circuit 11 outputs the interpolated signal to the signal multiplexer circuit 9 with a clock synchronized with the multiplexed signal (Step S5).

The same processes as Steps S1 to S5 are performed in the other line of the phase difference detection circuit 14 and the interpolation circuit 13 (Steps S6 to S10), which is different from the line of the phase difference detection circuit 12 and the interpolation circuit 11. The signal multiplexer circuit 9 multiplexes the signals interpolated by the interpolation circuits 11 and 13 and outputs the multiplexed signal (Step S11).

Figure 5:
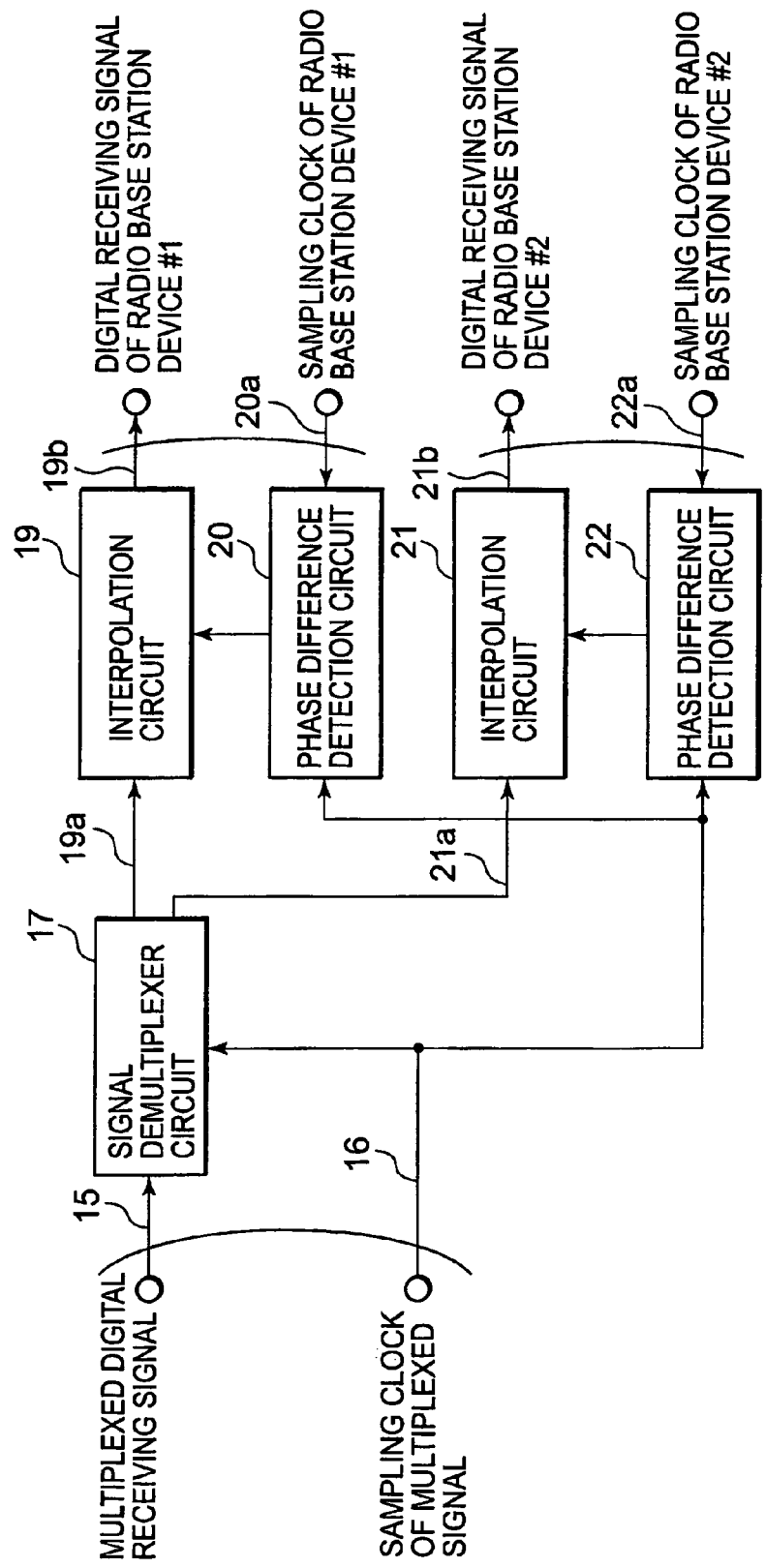
FIG. 5 is a block diagram showing a configuration of the multiplexing/demultiplexing device for reception according to the first embodiment of the present invention (in a case where an input signal is demultiplexed).

Next, the details of the multiplexing/demultiplexing device of this embodiment (in a case where an input signal is demultiplexed) will be described below with reference to FIG. 5. Referring to FIG. 5, the multiplexing/demultiplexing device 3 has interpolation circuits 19 and 21, phase difference detection circuits 20 and 22, and a signal demultiplexer circuit 17.

The signal demultiplexer circuit 17 demultiplexes a multiplex digital signal inputted from the amplifier device 2 into digital receiving signals for the digital units of the radio base station devices. Furthermore, sampling clocks used in the digital units of the radio base station devices and a sampling clock synchronized with a baseband clock of the multiplexed signal are inputted into the phase difference detection circuits 20 and 22, respectively. Each of the phase difference detection circuits 20 and 22 compares phases between the clocks and outputs information on the phase difference (phase difference information) to the interpolation circuit 19 or 21. Based upon the phase difference information detected by the phase difference detection circuits 20 and 22, each of the interpolation circuits 19 and 21 performs an interpolation on the corresponding lines of demultiplexed digital receiving signals with a waveform delayed by the time corresponding to the phase difference of that line. As a result, the interpolation circuits 19 and 21 obtain digital receiving signals synchronized (or sampled) with the sampling clocks used in the respective digital units of the radio base stations. The digital receiving signals 19b and 21b obtained by the interpolation circuits 19 and 21 are outputted to the respective digital units of the radio base stations.

The sampling clock of the multiplexing/demultiplexing device 3 can be set to be the same as the sampling clock of either one of the radio base station devices. In such a case, the phase difference detection circuit and the interpolation circuit between that radio base station device and the multiplexing/demultiplexing device 3 are unnecessary, and one of output lines of the signal demultiplexer circuit 17 can directly be used for a digital receiving signal of that radio base station device.

Figure 6:
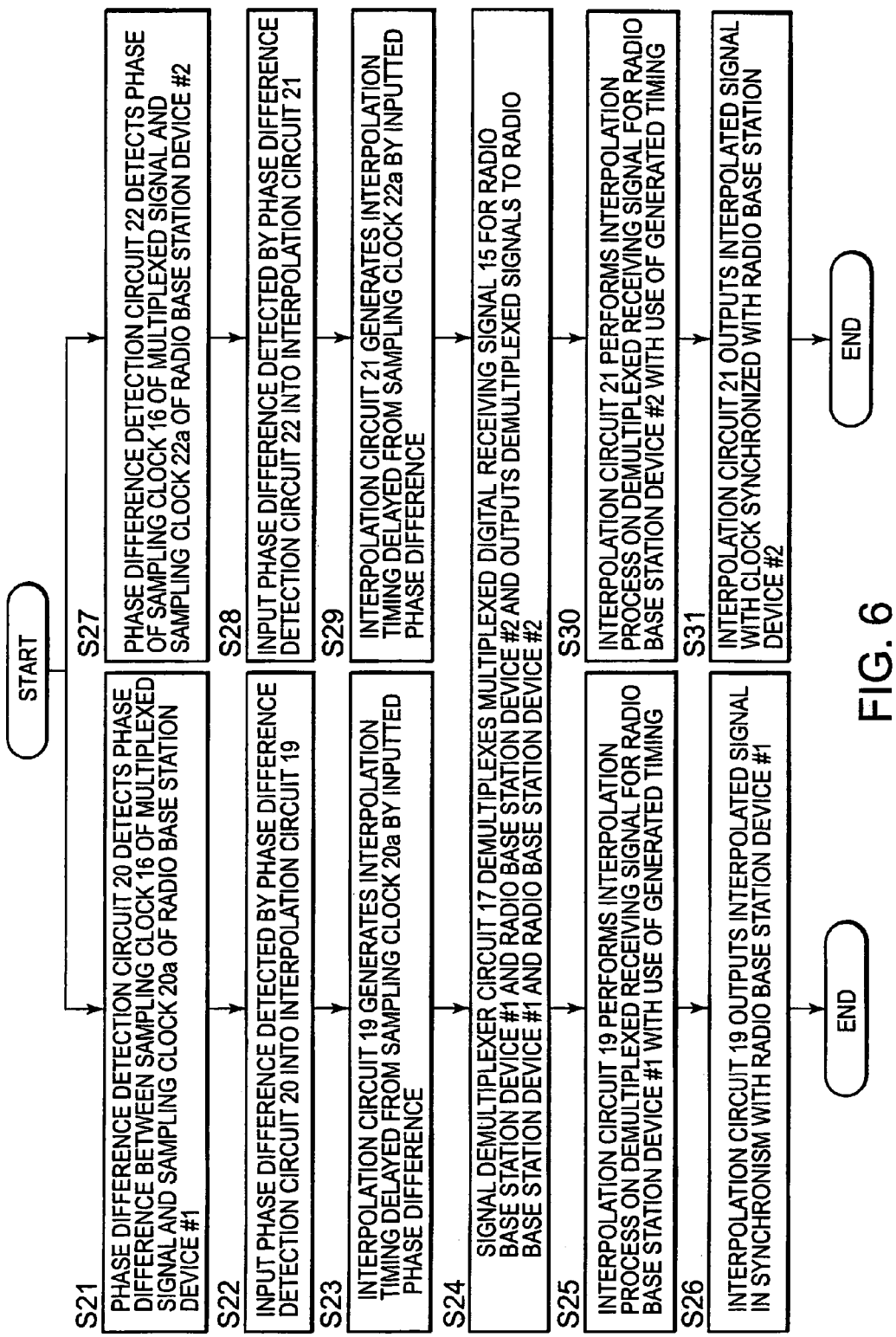
FIG. 6 is a flow chart explanatory of a signal demultiplex operation in the radio communication system according to the first embodiment of the present invention.

Operation of demultiplexing an input signal in the multiplexing/demultiplexing device according to the present embodiment will be described below with reference to FIG. 6. Referring to FIG. 6, the phase difference detection circuit 20 detects a phase difference between a sampling clock 16 of the multiplexed signal and a sampling clock 20a of the radio base station device #1 (Step S21). The phase difference detected by the phase difference detection circuit 20 is inputted into the interpolation circuit 19 (Step S22). Then the interpolation circuit 19 generates a sampling timing (interpolation timing) delayed from the sampling clock 20a by the phase difference (Step S23).

The signal demultiplexer circuit 17 demultiplexes a multiplex digital receiving signal 15 for the radio base station device #1 and the radio base station device #2 and outputs the demultiplexed signals to the radio base station device #1 and the radio base station device #2, respectively (Step S24). The interpolation circuit 19 uses the generated timing to perform an interpolation process on a demultiplexed receiving signal 19a for the radio base station device #1 (Step S25). The interpolation circuit 19 outputs an interpolated signal 19b with a clock synchronized with the sampling of the radio base station device #1 (Step S26).

The same processes as Steps S21 to S23, S25, and S26 are performed in the other line of the phase difference detection circuit 22 and the interpolation circuit 21 (Steps S27 to S29, S30, and S31), which is different from the line of the phase difference detection circuit 19 and the interpolation circuit 20.

(Second Embodiment)

The second embodiment of the present invention corresponds to a case where digital transmitting signals from digital units of radio base station devices have 1x sampling frequencies. A radio communication system of this embodiment has the same configuration as in the first embodiment shown in FIG. 1. The configuration and operation of the multiplexing/demultiplexing device are basically the same as that of the first embodiment shown in FIGS. 2, 4, and 6. Parts that differ from the first embodiment will be described below.

In order to obtain desired frequencies spectra of signal sequences with respect to the transmission rate, the multiplexing/demultiplexing device 3 needs to oversample and filter inputted digital transmitting signals. However, 1x sampled digital transmitting signals are discrete signal sequences having a transmission rate prior to the filtering. Specifically, since the 1x sampled digital transmitting signals are discrete signals prior to the filtering, a waveform between successive samples cannot be defined. Accordingly, a signal delayed by the clock phase (interpolation signal) cannot be obtained by an interpolation process.

For this reason, the 1x sampled digital transmitting signals that are outputted from the digital units of the radio base station devices are oversampled and filtered. At that time, as with the first embodiment of the present invention, a clock for oversampling the digital transmitting signal (oversampling frequency) is compared in phase with a sampling clock synchronized with the multiplexed signal. Filtering is conducted with a delay corresponding to the phase difference. Thus, it is possible to obtain a digital transmitting signal synchronized with the sampling clock for the multiplexed signal.

Figure 7:
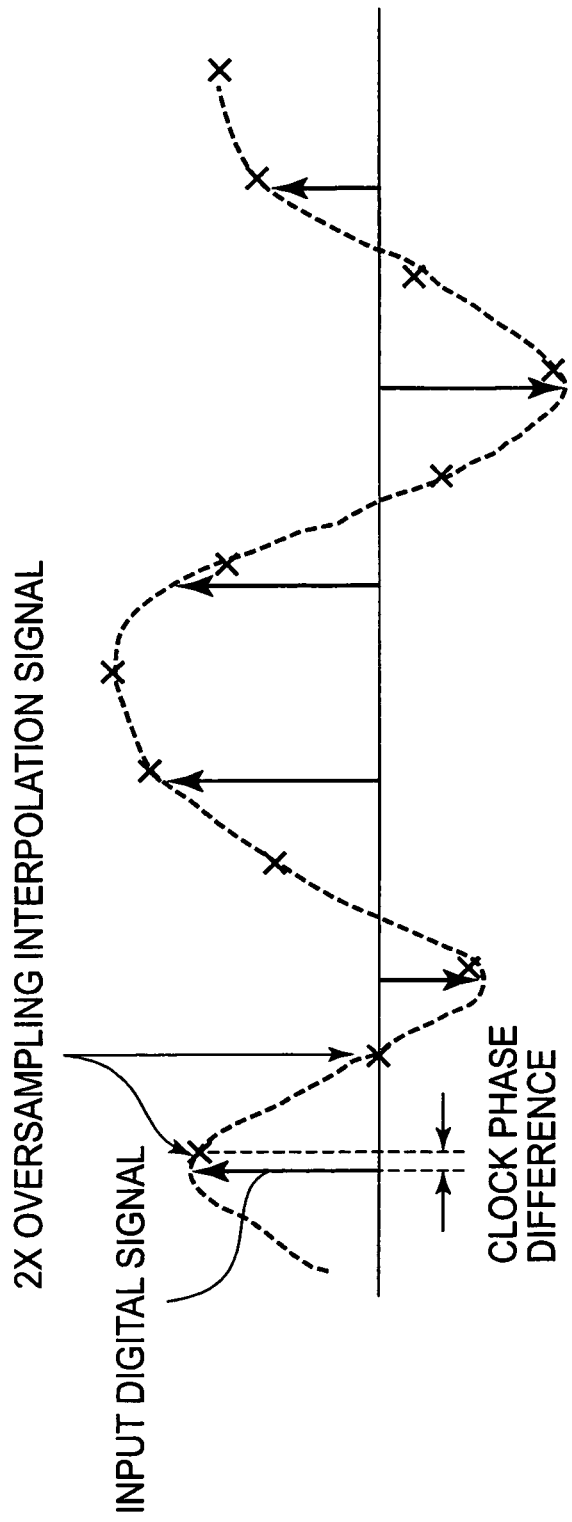
FIG. 7 is a conceptual diagram explanatory of an interpolation operation in a second embodiment of the present invention.

The interpolation operation of this embodiment will be described below with reference to FIG. 7. Referring to FIG. 7, filtering is conducted on an input digital signal, which is a 1x sampled discrete signal sequence, so as to identify a waveform of the successive signal. The interpolation circuit performs an interpolation process on the identified waveform with 2x oversampled values of an interpolation signal delayed by the clock phase difference and outputs the result to the signal multiplexer circuit. Oversampling by 2x or higher may be conducted.

In other words, the phase difference detection circuit calculates a phase difference between an oversampling frequency at which a digital transmitting signal of each input line is oversampled and a reference frequency of the multiplexed signal. The interpolation circuit filters a 1x sampled digital transmitting signal of each input line with use of the oversampling frequency. The interpolation circuit performs an interpolation on the filtered waveform with a certain number of interpolation signals delayed by the time corresponding to the phase difference of each input line. Thus, the interpolation circuit obtains a digital transmitting signal for each input line that has been sampled at the reference frequency of the multiplexed signal.

The number of the interpolation signals for the interpolation or the number of the interpolations may be determined by using a multiple of the oversampling frequency or by other methods.

(Third Embodiment)

The third embodiment of the present invention corresponds to a case where a transmission clock of a digital transmitting signal from a radio base station device needs to be synchronized with a clock of the amplifier device 2 at a radio frequency.

In some radio communication systems, a transmission clock of a digital transmitting signal of a radio base station device (transmission frequency of an input line) should be synchronized with a clock of the amplifier device 2 at a radio frequency (transmission frequency in the air for the multiplexed signal). This is because a terminal device to be communicated synchronizes the reference frequency of a source of the terminal device with the radio frequency of the base station and uses the source to generate a clock for receiving data.

The radio frequency of the amplifier device 2 is synchronized with a transmission clock (transmission frequency) of a wired section of the multiplexed signal. This is because the radio frequency of the amplifier device 2 is generated from a transmission clock of a multiplexed digital signal. According to the first and second embodiments described above, however, each of the digital transmitting signals is synchronized with the transmission clock or the sampling clock of the radio base station device. Therefore, at least one of the transmission clock and the sampling clock of the digital transmitting signal from the radio base station device is not synchronized with the clock of the amplifier device 2 at a radio frequency.

Thus, according to the third embodiment of the present invention, a frequency shift corresponding to a difference between a frequency of a transmission clock of a digital transmitting signal of a radio base station device and a radio frequency of the amplifier device that is synchronized with a transmission clock of a multiplexed signal is added to the digital transmitting signal of the baseband to thereby synchronize those frequencies with each other. A frequency obtained by dividing the radio frequency or a frequency that is a multiple of the transmission clock may be used for the transmission frequency to be synchronized. The configuration of the radio communication system of the present embodiment is the same as that of the first embodiment shown in FIG. 1.

Figure 8:
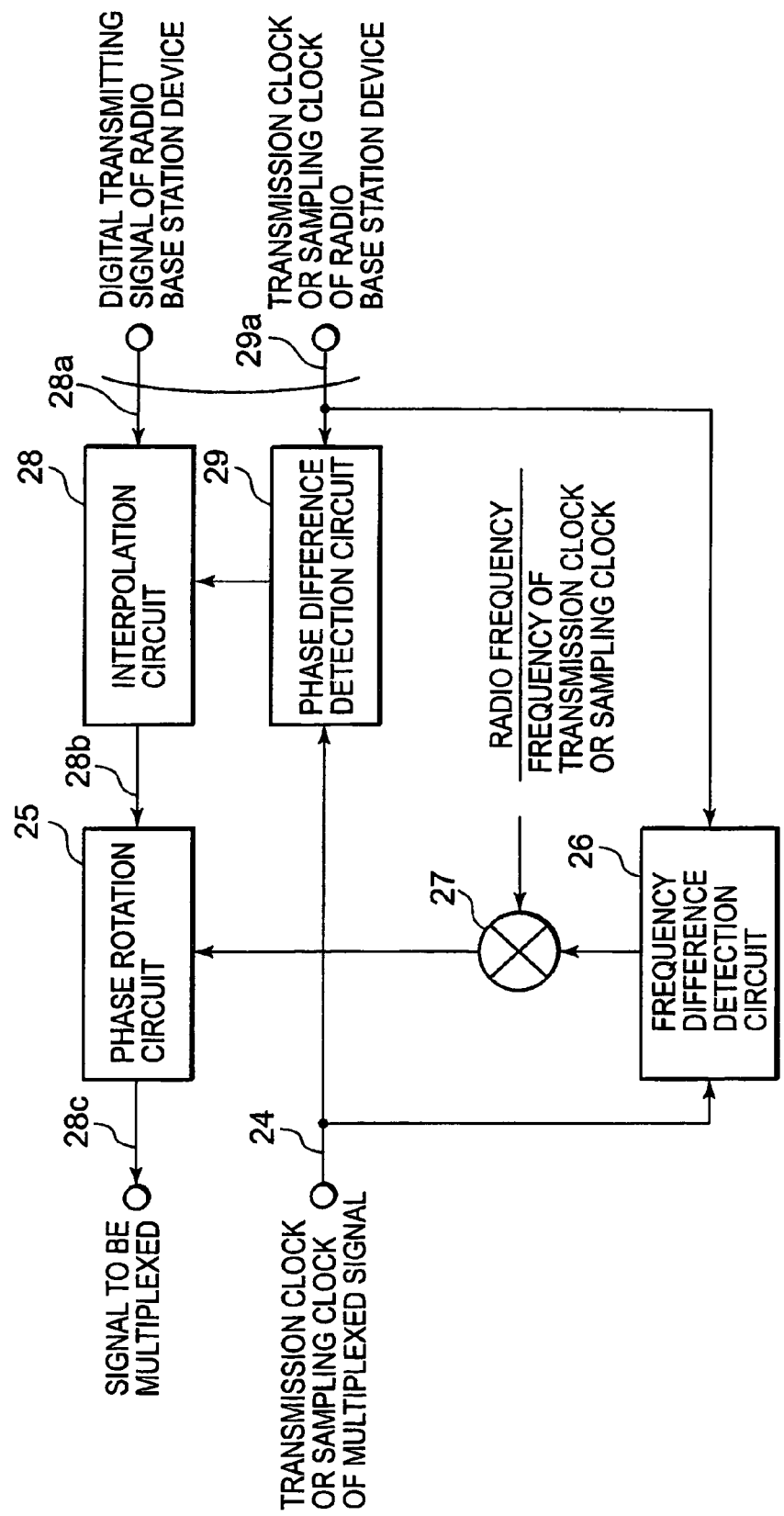
FIG. 8 is a block diagram showing a configuration of a multiplexing/demultiplexing device according to a third embodiment of the present invention (in a case where input signals are multiplexed).

The details of the multiplexing/demultiplexing device 3 of this embodiment (in a case where input signals are multiplexed) will be described below with reference to FIG. 8. Referring to FIG. 8, the multiplexing/demultiplexing device 3 has an interpolation circuit 28, a phase difference detection circuit 29, a frequency difference detection circuit 26, a multiplier circuit 27, a phase rotation circuit 25, and a signal multiplexer circuit (not shown).

The frequency difference detection circuit 26 detects a frequency difference between a transmission clock of a digital transmitting signal outputted from the digital unit of the radio base station device and a transmission clock of the multiplexed signal. The multiplier circuit 27 multiplies the detected frequency difference by a predetermined value (e.g., (the radio frequency)/(the frequency of the transmission clock)) to calculate a frequency difference at the radio frequency. The phase rotation circuit 25 provides an interpolated digital transmitting signal with a phase rotation corresponding to the calculated radio frequency.

In this example, the interpolated digital transmitting signal 28b is provided with a phase rotation. Nevertheless, the present invention may be configured such that a digital transmitting signal 28a to be inputted to the interpolation circuit 28 prior to the interpolation is provided with a phase rotation.

Furthermore, since the sampling clock is synchronous with the transmission clock, the sampling clock may be used instead of the transmission clock. The detection of the frequency difference is performed for each of the transmission clocks or for each of the sampling clocks.

Moreover, the configuration and operation of the interpolation circuit 28 and the phase difference detection circuit 25 are the same as those of the first embodiment. Although the present embodiment has been described with only one line, multiple lines of digital receiving signals can be provided with a phase rotation in the same manner as described above.

Figure 9:
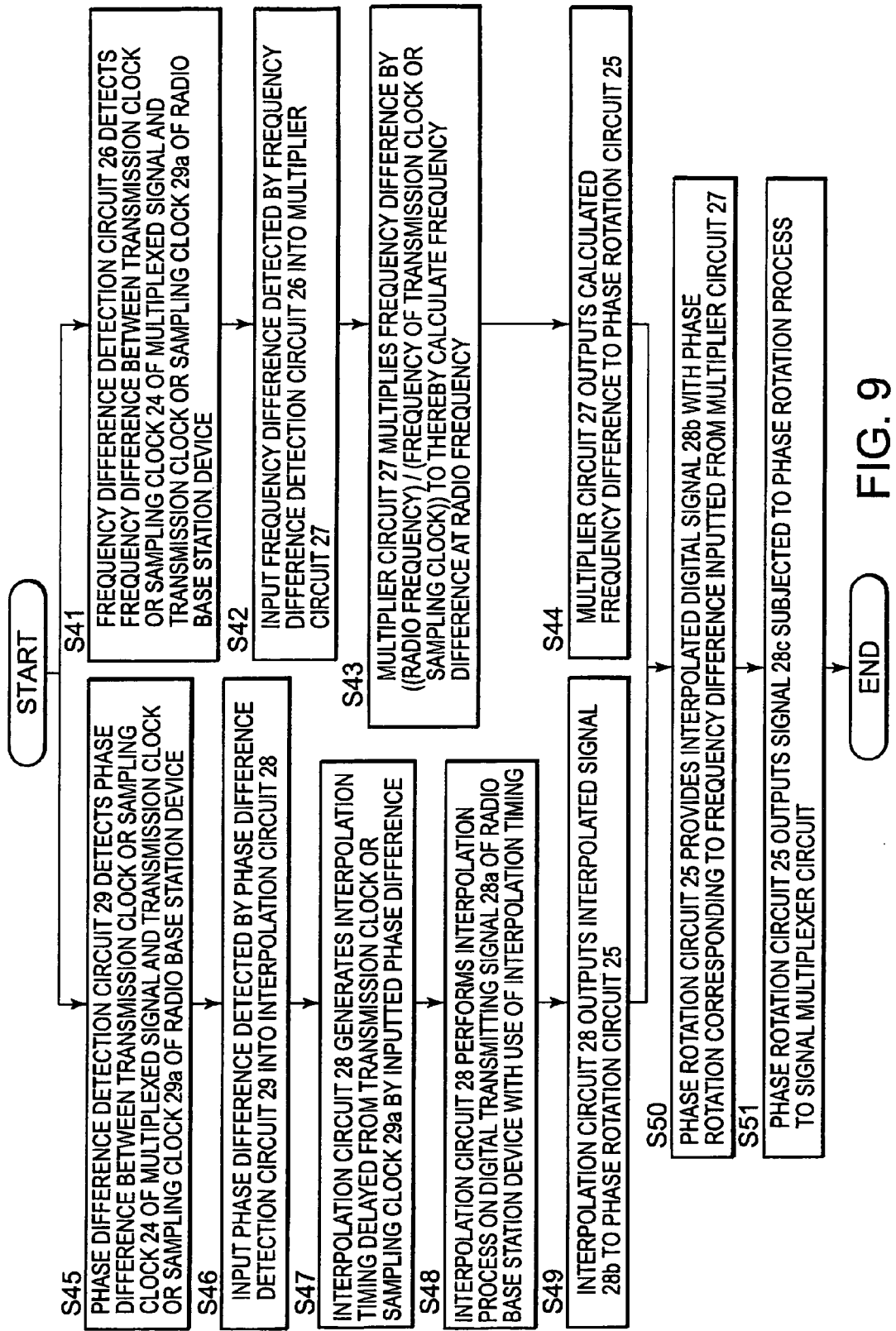
FIG. 9 is a flow chart explanatory of a signal multiplex operation in a radio communication system according to the third embodiment of the present invention.

Operation of multiplexing input signals in the multiplexing/demultiplexing device 3 according to the present embodiment will be described below with reference to FIG. 9. Referring to FIG. 9, the frequency difference detection circuit 26 detects a frequency difference between the transmission clock or sampling clock 24 of the multiplexed signal and the transmission clock or sampling clock 29a of the radio base station device (Step S41). The frequency difference detected by the frequency difference detection circuit 26 is inputted into the multiplier circuit 27 (Step S42). The multiplier circuit 27 multiplies the frequency difference by a predetermined value (e.g., (the radio frequency)/(the frequency of the transmission clock or sampling clock 29a)) to thereby calculate a frequency difference at the radio frequency (Step S43). The multiplier circuit 27 outputs the calculated frequency difference to the phase rotation circuit 25 (Step S44).

Meanwhile, the phase difference detection circuit 29 detects a phase difference between the transmission clock or sampling clock 24 of the multiplexed signal and the transmission clock or sampling clock 29a of the radio base station device (Step S45). The phase difference detected by the phase difference detection circuit 29 is inputted into the interpolation circuit 28 (Step S46). The interpolation circuit 28 generates an interpolation timing (sampling timing) delayed from the transmission clock or sampling clock 29a by the phase difference (Step S47). The interpolation circuit 28 uses the generated interpolation timing to perform an interpolation process on a digital transmitting signal 28a of the radio base station device (Step S48). The interpolation circuit 28 outputs an interpolated signal 28b to the phase rotation circuit 25 (Step S49).

The phase rotation circuit 25 provides the interpolated digital signal 28b with a phase rotation corresponding to the frequency difference inputted from the multiplier circuit 27 (Step S50). The phase rotation circuit 25 outputs a signal 28c subjected to the phase rotation process to the signal multiplexer circuit (Step S51).

Figure 10:
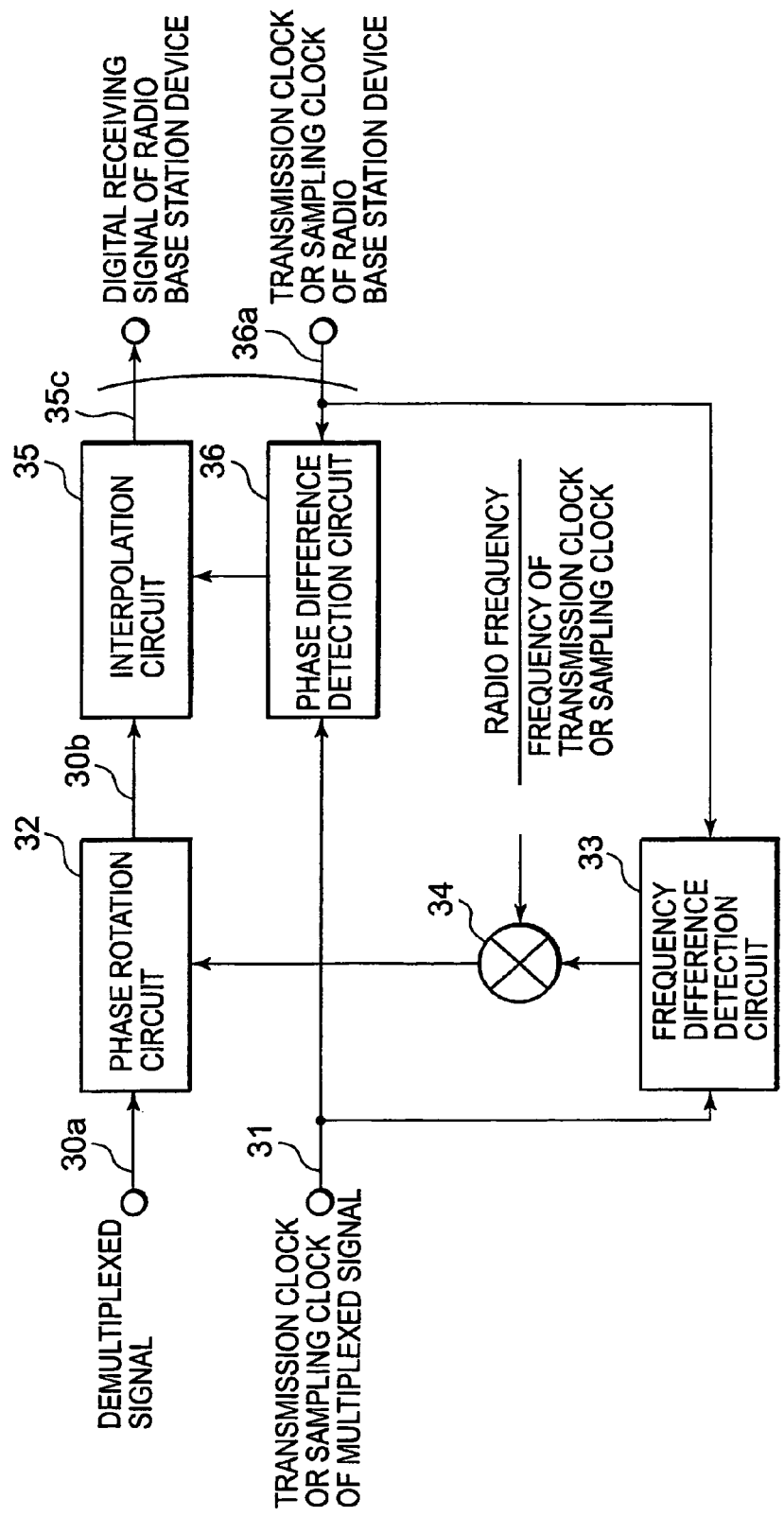
FIG. 10 is a block diagram showing a configuration of the multiplexing/demultiplexing device according to the third embodiment of the present invention (in a case where an input signal is demultiplexed).

Next, the details of the multiplexing/demultiplexing device 3 of this embodiment (in a case where an input signal is demultiplexed) will be described below with reference to FIG. 10. Referring to FIG. 10, the frequency difference detection circuit 33 detects a frequency difference between a transmission clock 36a of a digital transmitting signal outputted from the digital unit of the radio base station device and a transmission clock 31 of the multiplexed signal. The frequency difference is inputted into the multiplier circuit 34. The multiplier circuit 34 multiplies the frequency difference, which has been detected by the frequency difference detection circuit 33, by a predetermined value (e.g., (the radio frequency)/(the frequency of the transmission clock 36a)) to calculate a frequency difference at the radio frequency. The multiplier circuit 34 outputs the calculated frequency difference to the phase rotation circuit 32. The phase rotation circuit 32 provides a digital receiving signal 30a inputted from a signal demultiplexer circuit (not shown) with a phase rotation corresponding to the calculated frequency difference at the radio frequency. The phase rotation circuit 32 outputs a digital receiving signal 30b, which has been subjected to the phase rotation process, to the interpolation circuit 35.

In this example, the demultiplexed digital receiving signal 30a is provided with a phase rotation. Nevertheless, a digital receiving signal 30c, which is outputted from the interpolation circuit 35, may be provided with a phase rotation. Furthermore, since the sampling clock is synchronous with the transmission clock, the sampling clock may be used instead of the transmission clock. The configuration and operation of the interpolation circuit 35 and the phase difference detection circuit 36 are the same as those of the first embodiment. Although the present embodiment has been described with only one line, multiple lines of demultiplexed digital receiving signals can be provided with a phase rotation in the same manner as described above.

Figure 11:
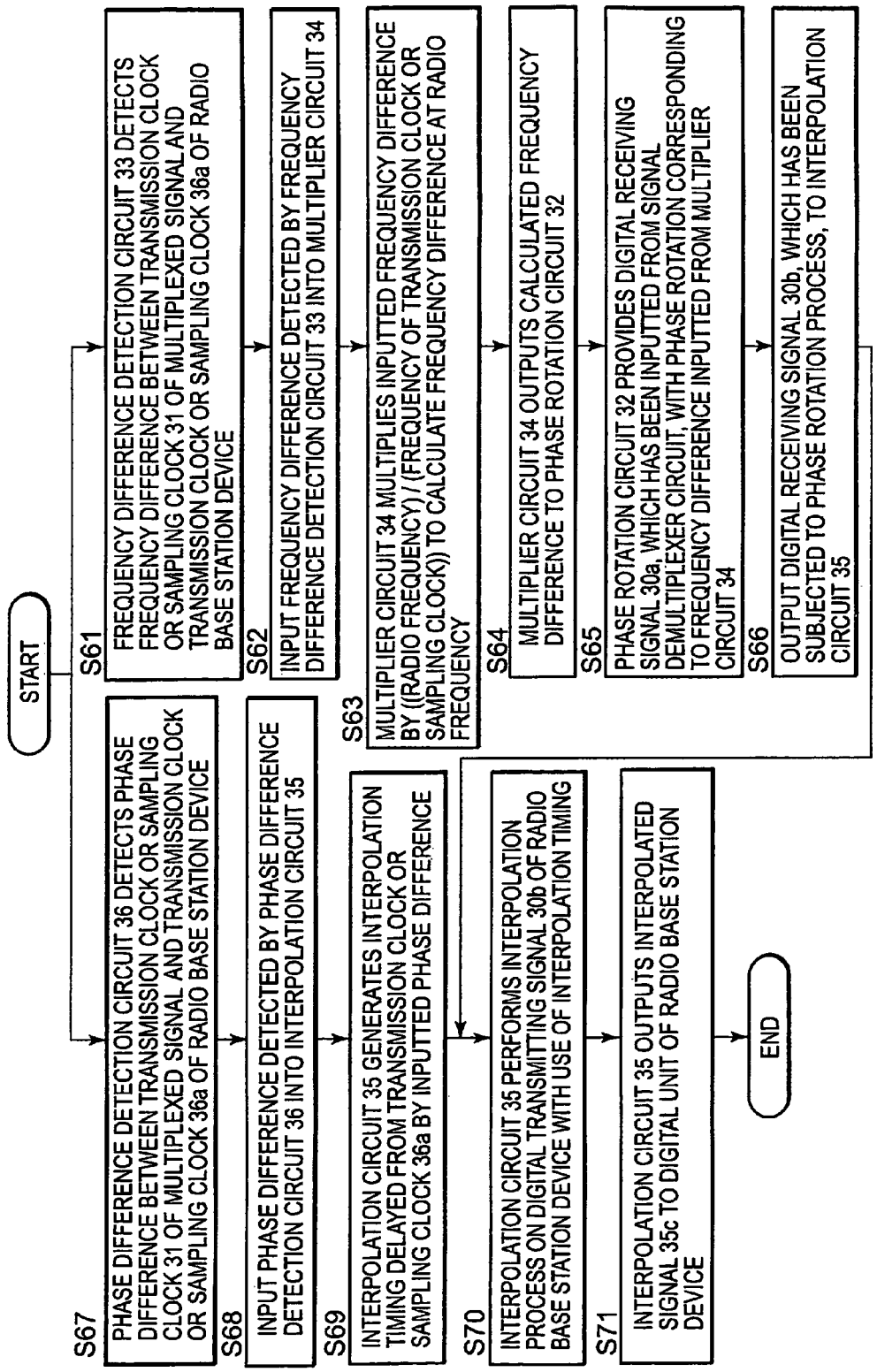
FIG. 11 is a flow chart explanatory of a signal demultiplex operation in the radio communication system according to the third embodiment of the present invention.
Figure 12:
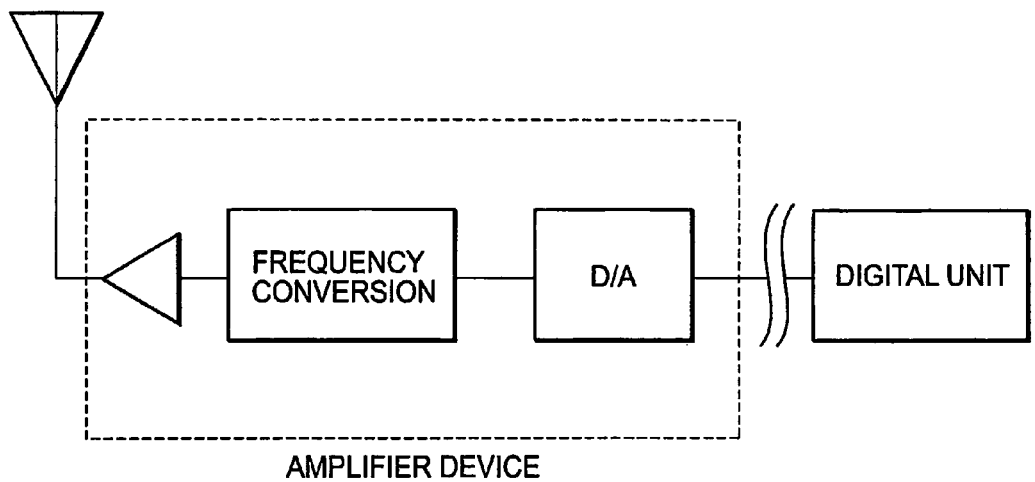
FIG. 12 is a diagram showing an overall configuration of a radio communication system.
Figure 13:
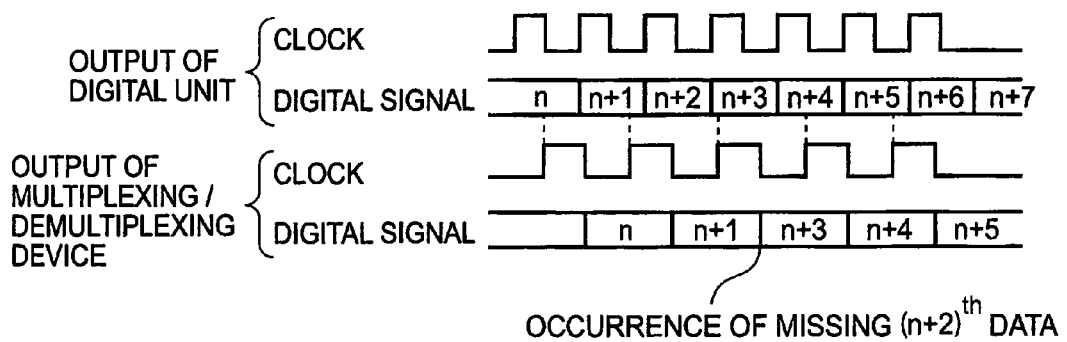
FIG. 13 is a diagram showing an example in which a clock of an output digital signal of a digital unit is not synchronized with a clock of an output digital signal of a multiplexing/demultiplexing device.

Operation of demultiplexing an input signal in the multiplexing/demultiplexing device 3 according to the present embodiment will be described below with reference to FIG. 11. Referring to FIG. 11, the frequency difference detection circuit 33 detects a frequency difference between the transmission clock or sampling clock 31 of the multiplexed signal and the transmission clock or sampling clock 36a of the radio base station device (Step S61). The frequency difference detected by the frequency difference detection circuit 33 is inputted into the multiplier circuit 34 (Step S62). The multiplier circuit 34 multiplies the inputted frequency difference by a predetermined value (e.g., (the radio frequency)/(the frequency of the transmission clock or sampling clock)) to calculate a frequency difference at the radio frequency (Step S63). The multiplier circuit 34 outputs the calculated frequency difference to the phase rotation circuit 32 (Step S64). The phase rotation circuit 32 provides the digital receiving signal 30a, which has been inputted from the signal demultiplexer circuit 30, with a phase rotation corresponding to the frequency difference inputted from the multiplier circuit 34 (Step S65). The phase rotation circuit 32 outputs the digital receiving signal 30b, which has been subjected to the phase rotation process, to the interpolation circuit 35 (Step S66).

Meanwhile, the phase difference detection circuit 36 detects a phase difference between the transmission clock or sampling clock 31 of the multiplexed signal and the transmission clock or sampling clock 36a of the radio base station device (Step S67). The phase difference calculated by the phase difference detection circuit 36 is inputted into the interpolation circuit 35 (Step S68). The interpolation circuit 35 generates an interpolation timing (sampling timing) delayed from the transmission clock or sampling clock 36a by the inputted phase difference (Step S69). The interpolation circuit 35 uses the interpolation timing to perform an interpolation process on the digital receiving signal 30b of the radio base station device (Step S70). The interpolation circuit 35 outputs the interpolated signal 35c to the digital unit of the radio base station device (Step S65). The configuration and operation of the interpolation circuit and the phase difference detection circuit are the same as those of the first embodiment. Although the present embodiment has been described with only one line, multiple lines of digital receiving signals can be provided with a phase rotation in the same manner as described above.

As described above, in the present embodiment, a frequency shift corresponding to a difference between a frequency of a transmission clock of a digital transmitting signal of each radio base station device and a radio frequency of an amplifier device is added to a digital transmitting signal having a baseband. Thus, those frequencies can be synchronized with each other. Even if the transmission clocks of the digital transmitting signals from the radio base station devices need to be synchronized with the clock of the amplifier device at the radio frequency, those signals can be multiplexed into one digital signal and transmitted to the amplifier device without any systematic problems. Similarly, a frequency shift is added to a digital receiving signal. Even if the transmission clocks of the radio base station devices need to be synchronized with the clock of the amplifier device at the radio frequency, the digital receiving signal can be demultiplexed and transmitted to the digital units of the radio base station devices without any systematic problems.

In the above embodiments, the present invention is configured such that all or part of the interpolation circuits, the phase difference detection circuits, the frequency difference detection circuit, the multiplier circuit, and the phase rotation circuit is provided in the multiplexing/demultiplexing device. Nevertheless, the present invention may be provided on the digital units of the radio base stations or the amplifier device. Furthermore, each of the radio base station devices has been described as including one digital unit. Nevertheless, each of the radio base station devices may include a plurality of digital units and multiplexing/demultiplexing devices.

Furthermore, from the viewpoint of correcting a synchronization clock of a digital signal, the above embodiments can be regarded as a radio communication system having a device for correcting a reference frequency of a digital signal for each of lines.

Specifically, a device for correcting a reference frequency of a digital signal has a first input means for inputting a first reference frequency and a first digital signal synchronized with the first reference frequency, a second input means for inputting a second reference frequency of an operation clock to be synchronized with the first digital signal, a detection means for detecting a phase difference between reference frequencies with use of the first reference frequency and the second reference frequency, and an interpolation means for performing an interpolation process on the first digital signal with an interpolation signal based on the detected phase difference to obtain a second digital signal, synchronizing the second digital signal obtained by the interpolation process with the second reference frequency, and outputting the second digital signal.

In the above device, the detection means may detect a phase difference between a frequency for oversampling the first digital signal and the second reference frequency. The interpolation means may perform a filtering process delayed by time based on the detected phase difference on the oversampled first digital signal to obtain the second digital signal.

Furthermore, the above device may have a frequency difference detection means for detecting a frequency difference between the first reference frequency and the second reference frequency, a multiplying means for calculating a frequency difference at a transmission frequency by using the calculated frequency difference, a frequency at which the first digital signal is transmitted, and a frequency at which the second digital signal is transmitted, and a phase rotation means for providing the first or second digital signal with a phase rotation corresponding to the calculated frequency difference at the transmission frequency.

Although the present invention has been described with reference to the above embodiments, the present invention is not limited to the above embodiments. It should be understood that those skilled in the art can make various modifications in configuration and details of the present invention within the scope of the claims of the present invention.

For example, from other points of view, the aforementioned embodiments can be described as follows.

A multiplexing device for multiplexing digital signals has a means for inputting an operation clock of each of input lines as a first reference frequency for each of the input lines, a means for inputting an operation clock of an output line as a second reference frequency, a means for inputting a first digital signal synchronized with the first clock for each of the input lines, a means for detecting phase difference information regarding a phase difference between the first reference frequency and the second reference frequency for each of the input lines, a means for performing an interpolation process on the first digital signal with an interpolation signal based on the phase difference information for each of the input lines, a means for synchronizing a second digital signal obtained from the interpolation process with the second reference frequency and outputting the second digital signal for each of the input lines, and a means for multiplexing the second digital signals respectively outputted for the input lines.

Furthermore, a demultiplexing device for demultiplexing a digital signal has a means for inputting an operation clock of an input line as a first reference frequency, a means for inputting an operation clock of each of output lines as a second reference frequency for each of the output lines, a means for demultiplexing a digital signal multiplexed in synchronism with the first reference frequency into the first digital signals for the output lines, a means for detecting phase difference information regarding a phase difference between the first reference frequency and the second reference frequency for each of the output lines, a means for performing an interpolation process on the first digital signal with an interpolation signal based on the phase difference information for each of the output lines, and a means for synchronizing a second digital signal obtained from the interpolation process with the second reference frequency and outputting the second digital signal for each of the output lines.

Specifically, a signal multiplexing device for multiplexing signals of a plurality of input lines of a communication system into a multiplexed signal has a phase difference detection part for detecting a phase difference from a reference frequency of the multiplexed signal and a reference frequency of each of the input lines, an interpolation part for performing an interpolation on a digital transmitting signal of each of the input lines with a signal delayed by time corresponding to the phase difference for each of the input lines based on the phase difference detected by the phase difference detection part to obtain a digital transmitting signal sampled with the reference frequency of the multiplexed signal for each of the input lines, and a signal multiplexing part for multiplexing the digital transmitting signals of the input lines, which have been obtained by the interpolation part, with use of the reference frequency of the multiplexed signal.

Furthermore, a demultiplexing device for demultiplexing a multiplexed signal of a communication system into signals for a plurality of output lines has a signal demultiplexing part for demultiplexing the multiplexed signal into digital receiving signals of the output lines, a phase difference detection part for detecting a phase difference from a reference frequency of the multiplexed signal and a reference frequency of each of the output lines, and an interpolation part for performing an interpolation on a digital receiving signal of each of the output lines with a signal delayed by time corresponding to the phase difference for each of the output lines based on the phase difference detected by the phase difference detection part to obtain a digital receiving signal sampled with the reference frequency for each of the output lines.

Moreover, a multiplexing/demultiplexing device for performing a multiplex/demultiplex of digital signals has a phase difference detection part for detecting a phase difference from a reference frequency of a multiplexed signal and a reference frequency of each of the input/output lines, an interpolation part for performing an interpolation on a digital transmitting/receiving signal of each of the input/output lines with a signal delayed by time corresponding to the phase difference for each of the input/output lines based on the phase difference detected by the phase difference detection part to obtain a digital transmitting/receiving signal sampled with the reference frequency of the multiplexed signal for each of the input/output lines, and a signal multiplexing/demultiplexing part for performing multiplex/demultiplex of the digital transmitting/receiving signals of the input/output lines with use of the reference frequency of the multiplexed signal.

Furthermore, in the multiplexing device, the phase difference detection part may calculate a phase difference between an oversampling frequency for oversampling the digital transmitting signal of each of the input lines and the reference frequency of the multiplexed signal. The interpolation part may perform an interpolation on a 1x sampled digital transmitting signal of each of the input lines with a predetermined number of interpolation signals delayed from a waveform filtered with use of an oversampling frequency by time corresponding to the phase difference for each of the input lines to obtain a digital transmitting signal of each of the input lines that is sampled with the reference frequency of the multiplexed signal.

The multiplexing device may have a frequency difference detection part for detecting a frequency difference from the reference frequency of the multiplexed signal and the reference frequency of each of the input lines, a multiplying part for multiplying the calculated frequency difference by (a transmission frequency of the multiplexed signal/a transmission frequency of the input line) to calculate a frequency difference at the transmission frequency, and a phase rotation part for providing the digital transmitting signal with a phase rotation corresponding to the calculated frequency difference at the transmission frequency before or after the interpolation.

Similarly, the demultiplexing device may have a frequency difference detection part for detecting a frequency difference from the reference frequency of the multiplexed signal and the reference frequency of each of the input lines, a multiplying part for multiplying the calculated frequency difference by (a transmission frequency of the multiplexed signal/a transmission frequency of the input line) to calculate a frequency difference at the transmission frequency, and a phase rotation circuit for providing the digital receiving signal with a phase rotation corresponding to the calculated frequency difference at the transmission frequency before or after the interpolation.

As described above, according to the present invention, an interpolation process is performed when signals are multiplexed or demultiplexed. Therefore, a signal sampled with a certain clock can be converted into a signal sampled with a clock of a multiplex or demultiplexed signal when it is to be multiplexed or demultiplexed. Accordingly, for example, even if sampling clocks of signals before the multiplex or sampling clocks of signals after the demultiplex are not synchronized with each other, those signals can properly be multiplexed or demultiplexed for each transmission line of the signals.

According to the present invention, the multiplex and the demultiplex can be performed even if a plurality of radio base station devices use different communication schemes. Examples of communication schemes available for the present invention include WiMAX (Worldwide Interoperability for Microwave Access), LTE (Long Term Evolution), and 3G (3rd Generation). Furthermore, the communication scheme of 4G (4th generation) may possibly be used.

This application claims the benefit of priority from Japanese patent application No. 2008-053228, filed on Mar. 4, 2008, the disclosure of which is incorporated herein in its entirety by reference.

DESCRIPTION OF REFERENCE NUMERALS

1 Antenna
2 Amplifier device (amplifying part or amplifying means)
3 Multiplexing/demultiplexing device
4a Digital unit of radio base station device #1 (first line)
4b Digital unit of radio base station device #2 (second line)
9 Signal multiplexer circuit (signal multiplexing part or signal multiplexing means)
11, 13 Interpolation circuit (interpolation part or interpolation means)
12, 14 Phase difference detection circuit (phase difference detection part or phase difference detection means)
17 Signal demultiplexer circuit (signal demultiplexing part or signal demultiplexing means)
19, 21 Interpolation circuit (interpolation part or interpolation means)
20, 22 Phase difference detection circuit (phase difference detection part or phase difference detection means)
25, 32 Phase rotation circuit (phase rotation part or phase rotation means)
26, 33 Frequency difference detection circuit (frequency difference detection part or frequency difference detection means)
27, 34 Multiplier circuit (multiplying part or multiplying means)
28, 35 Interpolation circuit (interpolation part or interpolation means)
29, 36 Phase difference detection circuit (phase difference detection part or phase rotation means)

The invention claimed is:

1. A signal multiplexing/demultiplexing method for multiplexing/demultiplexing a device of a radio communication system to interface an amplifier unit and digital parts of each radio base station, the digital parts of each radio base stations being operable asynchronously, the method comprising:
inputting an operation clock of each of digital part lines as a first reference frequency for each of the digital part lines, the digital part lines operating uniquely and asynchronously;
inputting an operation clock of an amplifier line as a second reference frequency; inputting a first digital signal synchronized with the first reference frequency for each of the digital part lines;
detecting phase difference information regarding a phase difference between the first reference frequency and the second reference frequency for each of the digital part lines;
performing an interpolation process on the first digital signal with an interpolation signal based on the phase difference information for each of the digital part lines;
synchronizing a second digital signal obtained from the interpolation process with the second reference frequency for each of the digital part lines and outputting the second digital signal;

multiplexing the second digital signals respectively outputted for the digital part lines and outputting to the amplifier unit as a multiplexed digital signal, inputting the operation clock of the amplifier line as the second reference frequency;

inputting the operation clock of each of the digital part lines of each of the radio base stations as the first reference frequency for each of the digital part lines, the digital part lines being unique and active asynchronously;

demultiplexing the multiplexed digital signal in synchronism with the second reference frequency into the second digital signals for each of the digital part lines;

performing an interpolation process on the second digital signal with an interpolation signal based on the phase difference information for each of the digital part lines; and synchronizing the first digital signal obtained from the interpolation process with the first reference frequency for each of the digital part lines and outputting the first digital signals to each of the digital parts as a digital receiving signal.

2. The signal multiplexing/demultiplexing method as recited in claim 1, further comprising:

detecting a phase difference from a reference frequency of the multiplexed signal and a reference frequency of each of the digital part lines by using a phase difference detection part;

performing an interpolation on a digital transmitting signal of each of the digital part lines with a signal delayed by a time corresponding to the phase difference for each of the digital part lines based on the phase difference detected by the phase difference detection part to obtain a digital transmitting signal sampled with the reference frequency of the multiplexed signal for each of the digital part lines by using an interpolation part; and multiplexing the digital transmitting signals of the digital part lines, which have been obtained by the interpolation part, with use of the reference frequency of the multiplexed signal by using a signal multiplexing part.

3. The signal multiplexing/demultiplexing method as recited in claim 2, further comprising:

demultiplexing the multiplexed signal into digital receiving signals of the amplifier lines by using a signal demultiplexing part;

detecting a phase difference from a reference frequency of the multiplexed signal and a reference frequency of each of the amplifier lines by using the phase difference detection part; and performing an interpolation on a digital receiving signal of each of the amplifier lines with a signal delayed by a time corresponding to the phase difference for each of the amplifier lines based on the phase difference detected by the phase difference detection part to obtain a digital receiving signal sampled with the reference frequency for each of the amplifier lines by using the interpolation part.

4. The signal multiplexing/demultiplexing method as recited claim 3 further comprising:

detecting a frequency difference from the reference frequency of the multiplexed signal and the reference frequency of each of the input lines by using a frequency difference detection part, multiplying the calculated frequency difference by a factor to calculate a frequency difference at the transmission frequency, a value of the factor obtaining a transmission frequency of the multiplexed digital signal by dividing each of a transmission frequency of the digital part lines by using the multiplying part, and providing the digital receiving signal with a phase rotation corresponding to the calculated frequency difference at the transmission frequency before or after the interpolation by using a phase rotation circuit.

5. The signal multiplexing/demultiplexing method as recited claim 2, wherein:

the phase difference detection part calculates a phase difference between an oversampling frequency for oversampling the digital transmitting signal of each of the digital part lines and the reference frequency of the multiplexed signal, and the interpolation part performs an interpolation on a 1× sampled digital transmitting signal of each of the digital part lines with a predetermined number of interpolation signals delayed from a waveform filtered with use of an oversampling frequency by a time corresponding to the phase difference for each of the digital part lines to obtain a digital transmitting signal of each of the digital part lines that is sampled with the reference frequency of the multiplexed signal.

6. The signal multiplexing/demultiplexing method as recited claim 2, further comprising:

detecting a frequency difference from the second reference frequency of the multiplexed digital signal and the first reference frequency of each of the digital part lines by using the frequency difference detection part, multiplying the calculated frequency difference by a factor to calculate a frequency difference at the transmission frequency, a value of the factor obtaining a transmission frequency of the multiplexed digital signal by dividing each of a transmission frequency of the digital part lines by using the multiplying part, and providing the digital transmitting signal with a phase rotation corresponding to the calculated frequency difference at the transmission frequency before or after the interpolation by using a phase rotation circuit.

7. The signal multiplexing/demultiplexing method as recited in claim 1, further comprising:

detecting a phase difference from a reference frequency of the multiplexed signal and a reference frequency of each of the digital part lines by using a phase difference detection part.

8. A signal multiplexing/demultiplexing device of a communication system, said signal multiplexing/demultiplexing device comprising:

a phase difference detection circuit detecting a phase difference from a reference frequency of a multiplexed signal and a reference frequency of each of digital part lines, the digital part lines operating uniquely and asynchronously;

a first interpolation circuit performing an interpolation on a digital transmitting signal of each of the digital part lines with a signal delayed by a time corresponding to the phase difference for each of the digital part lines based on the phase difference detected by the phase difference detection part to obtain a digital transmitting signal sampled with the reference frequency of the multiplexed signal for each of the digital part lines;

a signal multiplexing circuit multiplexing the digital transmitting signals of the digital part lines and outputting to the amplifier unit as a multiplexed digital signal, a signal demultiplexing circuit demultiplexing the multiplexed signal into one or more digital receiving signals of an amplifier; and an interpolation circuit performing an interpolation on the one or more digital receiving signals with a signal delayed by a time corresponding to a phase difference for the amplifier, based on the phase difference detected by the phase difference detection circuit, to obtain one or more digital receiving signals sampled with the reference frequency for each of the digital part lines.

9. The multiplexing/demultiplexing device as recited in claim 8, wherein:
the phase difference detection circuit calculates a phase difference between an oversampling frequency for oversampling the digital transmitting signal of each of the digital part lines and the reference frequency of the multiplexed signal, and
the interpolation circuit performs an interpolation on a 1× sampled digital transmitting signal of each of the digital part lines with a predetermined number of interpolation signals delayed from a waveform filtered with use of an oversampling frequency by a time corresponding to the phase difference for each of the digital part lines to obtain a digital transmitting signal of each of the digital part lines that is sampled with the reference frequency of the multiplexed signal.

10. The multiplexing/demultiplexing device as recited in claim 8 further comprising:
a frequency difference detection circuit detecting a frequency difference from the reference frequency of the multiplexed signal and the reference frequency of each of the digital part lines;
a multiplying circuit multiplying the calculated frequency difference by a factor to calculate a frequency difference at a transmission frequency; and
a phase rotation circuit providing the digital transmitting signal with a phase rotation corresponding to the calculated frequency difference at the transmission frequency before or after the interpolation.

11. The multiplexing/demultiplexing device as recited in claim 8, further comprising:
a frequency difference detection circuit detecting a frequency difference from the reference frequency of the multiplexed signal and the reference frequency of each of the digital part lines.

12. A radio communication system including a multiplexing/demultiplexing device and a plurality of base station devices, wherein:
each of the plurality of base station devices outputs a first reference frequency and a first digital signal sampled with the first reference frequency to the multiplexing/demultiplexing device,
the multiplexing/demultiplexing device obtains a second reference frequency of the multiplexed signal and performs an interpolation process on each of the first digital signals to generate a second digital signal based on phase difference information regarding a phase difference between the first reference frequency and the second reference frequency,
the second digital signals for the base station devices that have been obtained from the interpolation process are sampled with the second reference frequency, multiplexed, and transmitted to an amplifying part,
wherein the signal multiplexing/demultiplexing device:
demultiplexes a multiplex digital signal sampled with the second reference frequency into first digital signals for each of plurality of the base station devices;
obtains an operation clock as the first reference frequency from each of the plurality of base station devices;
performs the interpolation process on each of the second digital signals to generate the first digital signal for each of the plurality of base station devices based on phase difference information regarding a phase difference between the first reference frequency and the second reference frequency; and
samples each of the generated first digital signals with the first reference frequency for each of the plurality of base station devices and outputs the generated second digital signals to corresponding base station devices, and
wherein said first and second digital signals operate uniquely and asynchronously.

13. The radio communication system as recited in claim 12, wherein said first and second digital signals operate asynchronously with respect to one another.

14. The radio communication system as recited in claim 12, wherein said first and second digital signals at least one of input one or more signals and output one or more signals asynchronously with respect to one another.

15. A multiplexing/demultiplexing device comprising a processor executing instructions from a memory, said instructions, when executed by the processor, causing said device to:
input an operation clock of each of digital part lines as a first reference frequency for each of the digital part lines, the digital part lines operating uniquely and asynchronously;
input an operation clock of an amplifier line as a second reference frequency;
input a first digital signal synchronized with the first reference frequency for each of the digital part lines;
detect phase difference information regarding a phase difference between the first reference frequency and the second reference frequency for each of the digital part lines;
perform an interpolation process on the first digital signal with an interpolation signal based on the phase difference information for each of the digital part lines;
synchronize a second digital signal obtained from the interpolation process with the second reference frequency and output the second digital signal for each of the digital part lines;
multiplex the second digital signals respectively outputted for the digital part lines and outputting to the amplifier unit as a multiplexed digital signal;
input the operation clock of each of the digital part lines as the second reference frequency;
input the operation clock of the amplifier line as the first reference frequency for each of the digital part lines;
demultiplex a digital signal multiplexed in synchronism with the second reference frequency into the first digital signals for the output lines;
detect phase difference information regarding a phase difference between the first reference frequency and the second reference frequency for each of the digital part lines; and
synchronize a second digital signal obtained from the interpolation process with the first reference frequency for each of the digital part lines and outputting the second digital signal.

16. The multiplexing/demultiplexing device as recited in claim 15, wherein said digital part lines correspond to digital parts of one or more radio base stations.

17. The multiplexing/demultiplexing device as recited in claim 16, wherein one or more of an operating standard and a communication speed of a first radio base station of said one or more radio base stations differs from one or more of an operating standard and a communication speed of a second radio base station of said one or more radio base stations.

\* \* \* \* \*